(12) United States Patent
Heinz et al.

(10) Patent No.: US 11,574,167 B2
(45) Date of Patent: Feb. 7, 2023

(54) CIRCUIT AND A METHOD FOR DETERMINING AN ATTITUDE OF A MAGNET, AND JOYSTICK

(71) Applicant: Infineon Technologies AG, Neubiberg (DE)

(72) Inventors: Richard Heinz, Munich (DE); Andrea Hollenbach, Munich (DE); Stephan Leisenheimer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 167 days.

(21) Appl. No.: 17/069,187

(22) Filed: Oct. 13, 2020

(65) Prior Publication Data
US 2021/0110239 A1 Apr. 15, 2021

(30) Foreign Application Priority Data
Oct. 15, 2019 (DE) .......................... 102019127795.7

(51) Int. Cl.
| | |
|---|---|
| *G06N 3/04* | (2006.01) |
| *G06N 3/08* | (2006.01) |
| *G06N 3/063* | (2006.01) |
| *G06F 17/16* | (2006.01) |
| *G05G 9/047* | (2006.01) |
| *G06F 3/0338* | (2013.01) |

(52) U.S. Cl.
CPC ........... *G06N 3/0454* (2013.01); *G05G 9/047* (2013.01); *G06F 3/0338* (2013.01); *G06F 17/16* (2013.01); *G06N 3/063* (2013.01); *G06N 3/08* (2013.01); *G05G 2009/04703* (2013.01); *G05G 2009/04755* (2013.01)

(58) Field of Classification Search
CPC ........ G06N 3/0454; G06N 3/063; G06N 3/08; G05G 9/047; G05G 2009/04703; G05G 2009/04755; G05G 2009/04707; G06F 3/0338; G06F 17/16; G06F 3/03548; G06F 3/0362
See application file for complete search history.

(56) References Cited

U.S. PATENT DOCUMENTS

| | | | |
|---|---|---|---|
| 6,462,731 B1 * | 10/2002 | Stoffers | G05G 9/047 345/161 |
| 10,362,056 B1 | 7/2019 | El Hariri et al. | |
| 2002/0190948 A1 * | 12/2002 | Coutant | G05G 23/02 345/161 |
| 2018/0018358 A1 | 1/2018 | Birdwell et al. | |
| 2019/0132591 A1 | 5/2019 | Zhang et al. | |

(Continued)

FOREIGN PATENT DOCUMENTS

| | | |
|---|---|---|
| DE | 202006000158 U1 | 5/2007 |
| DE | 102015203686 A1 | 9/2016 |

(Continued)

*Primary Examiner* — Mark W Regn
(74) *Attorney, Agent, or Firm* — Harrity & Harrity, LLP

(57) ABSTRACT

An exemplary embodiment of a circuit for determining information about the position, attitude, or orientation of a magnet comprises an input interface configured to receive components of a magnetic field produced by the magnet. An evaluation logic unit corresponds to at least one trained neural network and is configured to determine the information about the position, attitude, or orientation of the magnet on the basis of the received components.

25 Claims, 6 Drawing Sheets

(56) References Cited

U.S. PATENT DOCUMENTS

2020/0356131 A1\* 11/2020 O'Neill .................. G05G 9/047
2021/0015634 A1\* 1/2021 Eslam Pour .......... A61F 2/4684

FOREIGN PATENT DOCUMENTS

| DE | 102016005141 A1 | 11/2016 | | |
|----|----|----|----|----|
| DE | 102018119513 A1 | 2/2019 | | |
| EP | 3570221 A1 \* | 11/2019 | ............. | G06K 9/623 |
| WO | WO-2019166196 A1 \* | 9/2019 | | |

\* cited by examiner

Tilt movement + linear movement + rotational movement

2x3D magnetic field sensors

CIRCUIT AND A METHOD FOR DETERMINING AN ATTITUDE OF A MAGNET, AND JOYSTICK This application claims priority to German Patent No. 102019127795.7, filed on Oct. 15, 2019, which is incorporated herein by reference in its entirety.

FIELD

Exemplary embodiments are concerned with a circuit and a method for determining an attitude of a magnet and with a joystick having a magnet.

BACKGROUND

The position or orientation of magnets is detected for example in joysticks in order to determine the attitude that the joystick is currently in. Joysticks are used for example to control aircraft, and they frequently have and control 3 degrees of freedom of movement. Tilting the joystick forward or backward can be used to control the pitch angle of the aircraft, a pivot to the left or right being able to be used to control the roll angle of the aircraft. Similarly, a rotation of the joystick along the longitudinal axis thereof can control the yaw angle of the aircraft. Apart from aircraft, similar joysticks are also used for agricultural utility vehicles, cranes, excavators and the like. Said degrees of freedom are determined using magnets, among other things, that are mounted on the joystick and produce a magnetic field, the components of which are measured and used to calculate the orientation of the joystick.

In this regard, for the rotation of the joystick along the longitudinal axis thereof, for example, a magnet magnetized perpendicularly to the longitudinal axis can be used, the magnetic field of said magnet being measured by means of a magnetic field sensor. If the direction of the magnetic field is known, the geometric orientation of the magnet and hence the rotation of the joystick are also known. Irrespective of this, for example a magnet magnetized in the direction of the longitudinal axis of the joystick can be used to determine the pivoting of the joystick to the left or right or forward or backward. If the direction of the magnetic field is known, it is possible to calculate the angle at which the magnet producing the magnetic field, and hence the joystick, is relative to the magnetic field sensor, that is to say the angle at which the joystick is tilted to the left/right and forward/backward.

Since these two measurements are mutually independent determinations, simultaneous determination of the 3 cited degrees of freedom conventionally requires a high level of mechanical effort. By way of example, it would first be necessary to form a system within which the joystick can be rotated about the longitudinal axis with respect to a fixed reference, permitting determination of the yaw angle. In order to be able to simultaneously determine the tilt about the other two axes, however, a further mechanical solution would need to be found that allows the joystick together with the entire system measuring the yaw angle to be moved with respect to a further fixed reference. Such systems have a complex mechanical design and are therefore expensive and possibly comparatively susceptible to mechanical damage. There is therefore the need to determine the attitude of a magnet in space differently and with less effort.

SUMMARY

An exemplary embodiment of a circuit for determining an position, attitude, or orientation of a magnet, which circuit has an input interface designed to receive components of a magnetic field produced by the magnet, allows this by virtue of it having an evaluation logic unit corresponding to at least one trained neural network that determines the information about the attitude of the magnet on the basis of the received components. A trained neural network can also be used to learn analytically noncalculable field configurations such that these can be used to infer the attitude, that is to say for example the position and orientation, of the magnet producing the magnetic field.

An exemplary embodiment of a method for determining information about an attitude of a magnet therefore comprises measuring components of a magnetic field produced by the magnet and processing the measured components using a trained neural network, in order to determine the information about the attitude of the magnet.

An exemplary embodiment of a joystick comprises a bearing, by means of which a control lever is mounted so as to move with at least three degrees of freedom with respect to a housing. The control lever has a portion movable by a user and an inner portion, which are opposite one another on different sides of the bearing in a longitudinal direction. A magnet is arranged on the control lever. At least one magnetic field sensor is arranged at a fixed location with respect to the housing and is designed to measure magnetic field components of a magnetic field produced by the magnet. Such a simple mechanical arrangement may be sufficient, according to some exemplary embodiments, to measure the information about the desired degrees of freedom of the movement of the joystick by means of just one magnet, for example by means of an exemplary embodiment of a circuit.

BRIEF DESCRIPTION OF THE DRAWINGS

A few examples of apparatuses and/or methods are explained in more detail below merely by way of example with reference to the accompanying figures, in which:

FIGS. 2-1, 2-2, and 2-3 show examples of possible attitudes of a magnet in space;

FIG. 3 shows a further exemplary embodiment of a joystick;

DETAILED DESCRIPTION

Various examples will now be described more thoroughly with reference to the accompanying figures. In the figures, the thicknesses of lines, layers and/or regions may be exaggerated for the purposes of elucidation. Further examples can have various modifications and alternative forms for those shown below and therefore cover a wide variety of modifications, counterparts and alternatives that fall within the scope of the disclosure.

Throughout the description of the figures, identical or similar reference signs refer to identical or similar elements that, in a comparison with one another, may be implemented identically or in modified form, whereas they provide the same or a similar function.

It goes without saying that if one element is designated as "connected" or "coupled" to another element, the elements may be connected or coupled directly or via one or more intermediate elements. If two elements A and B are combined using an "or", this should be understood to mean that all possible combinations are disclosed, i.e. only A, only B, and A and B, unless explicitly or implicitly defined otherwise. An alternative wording for the same combinations is "at least one from A and B" or "A and/or B". The same applies to combinations of more than two elements.

The terminology used here for describing specific examples is not intended to be limiting for further examples. If a singular form, e.g., "a, an" and "the", is used and the use of only a single element is defined neither explicitly nor implicitly as obligatory, further examples can also use plural elements in order to implement the same function. If a function is described below as being implemented using multiple elements, further examples can implement the same function using a single element or a single processing entity. Furthermore, it goes without saying that the terms "comprises", "comprising", "has" and/or "having" in their usage indicate with greater precision the presence of the specified features, integers, steps, operations, processes, elements, components and/or a group thereof, but do not exclude the presence or the addition of one or more other features, integers, steps, operations, processes, elements, components and/or a group thereof.

Unless defined otherwise, all terms (including technical and scientific terms) are used here in their customary meaning in the field with which examples are associated.

Figure 1:
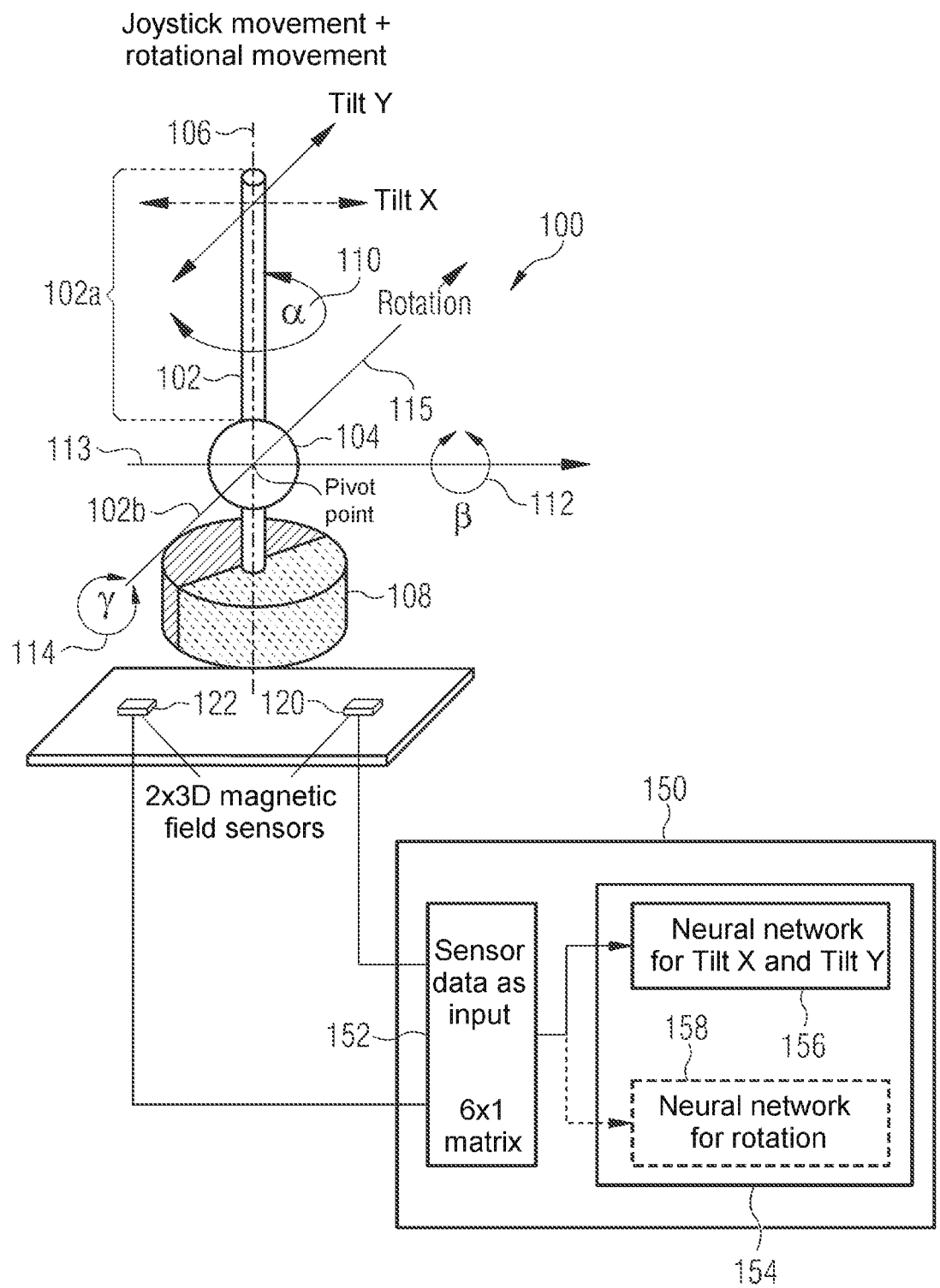
FIG. 1 shows an exemplary embodiment of a joystick and an exemplary embodiment of a circuit for determining information about an attitude of a magnet.

FIG. 1 schematically shows an exemplary embodiment of a joystick and an exemplary embodiment of a circuit for determining information about a position, an attitude, or an orientation of a magnet. By way of example, the information about the position, attitude, or orientation of a magnet inside a joystick is determined, information about the position, attitude, or orientation of magnets mounted differently or located freely in space similarly being able to be determined according to other exemplary embodiments.

The joystick 100 has a control lever 102 that extends in a longitudinal direction 106 of the joystick through a bearing 104, so that the control lever 102 has, outside a housing, which is not depicted here, a portion 102a controllable by a user and an inner portion 102b. The opposing bearing connected to a housing of the joystick is not depicted for reasons of clarity. Arranged at the end of the inner portion 102b is a magnet 108, which is magnetized perpendicularly to the longitudinal axis 106, that is to say diametrically with reference to the magnet itself. The spherical bearing 104 allows the magnet 108 to move in 3 degrees of freedom, namely a rotation about the longitudinal axis 106 through a first rotation angle 110, a rotation about a first axis 113, which runs through the bearing 104, through a second rotation angle 112, and a rotation about a second axis 115, which runs through the bearing 104 and is perpendicular to the first axis 113, through a third rotation angle 114. In the example shown for a joystick, the longitudinal axis 106 is rotated together with the magnet 108 in each case, that is to say that the longitudinal axis 106 is also rotated with respect to the other two axes.

As a result of the arrangement depicted in FIG. 1, the interaction of the user with the portion 102a of the control lever that is movable by the user changes the attitude of the magnet 108 in space. The attitude of the magnet 108 in space can be understood to mean not only the position of the magnet in space but also an arbitrary set of parameters that allows the arrangement of the magnet in space to be described explicitly, for example the position of the center of gravity of the magnet, and also the orientation thereof, that is to say for example the axis defined by the direction of the strongest magnetic field lines.

In order to measure the magnetic field produced by the magnet 108, an exemplary embodiment of a joystick 100 has at least one magnetic field sensor 120, which is arranged at a fixed location with respect to the housing. The opposing bearing of the bearing 104 is also at a fixed location with respect to said housing, which means that a movement of the control lever 102 results in the magnet 108 being moved and rotated relative to the magnetic field sensor 120, that is to say the attitude of the magnet 108 relative to the magnetic field sensor 120 changing. In the exemplary embodiment shown in FIG. 1, a further optional magnetic field sensor 122 is additionally shown, which can also be omitted according to some exemplary embodiments, however.

The magnetic field sensor 120 measures components of the magnetic field produced by the magnet 108, which are evaluated by means of the exemplary embodiment shown in FIG. 1 for a circuit 150 for determining an attitude of the magnet 108, in order to determine information about the attitude of the magnet 108. For this purpose, the circuit 150 has an input interface 152, in order to receive components of the magnetic field produced by the magnet 108, that is to say for example those components that were measured by the magnetic field sensor 120. The circuit 150 also has an evaluation logic unit 154 corresponding to at least one trained neural network 156. As a result of the function of the trained neural network, the selected logic unit 154 is designed or able to determine information about the attitude of the magnet 108 on the basis of the received components of the magnetic field.

The information about the attitude does not necessarily have to be the complete information needed in order to describe the position and orientation of the magnet in space completely and explicitly, even though this is the case in some exemplary embodiments. It is also not necessary for the information about the attitude to be determined such that it is available directly in a predetermined coordinate system, for example in the form of vectors for the position of the center of gravity of the magnet and for the orientation thereof. Rather, it is sufficient if the information about the attitude is determined such that the position and orientation of the magnet can be derived explicitly from the determined information. The determination of information about the attitude, which information does not correspond directly to location coordinates or the sought variables, may be advantageous for example in order to increase the accuracy of the prediction of the neural network. In the case shown for the application in a joystick, it is enough for example to determine three angles as information about the attitude, namely the first rotation angle 110, the second rotation angle 112 and the third rotation angle 114.

For example, a single neural network can be used to determine the complete information for all three angles. As in the case shown in FIG. 1, exemplary embodiments of a circuit 150 can also have an evaluation logic unit 154 corresponding to a trained neural network that determines just a subset of this information. The evaluation logic unit 154 is configured such that it corresponds to a first neural network 156 that determines the second rotation angle 112 and the third rotation angle 114 on the basis of the components of the magnetic field. The functionality of a second trained neural network 158 for determining the first rotation angle 110 is implemented in the circuit 150 shown in FIG. 1, but should be understood to be optional. Other exemplary embodiments can thus have just one of the two neural networks in each case.

The magnetization shown in FIG. 1 for the magnet 108 perpendicularly to the longitudinal axis 106 results in it being analytically impossible to calculate the second rotation angle 112 and the third rotation angle 114 from the measured components of the magnetic field with sufficient accuracy, in particular because the magnet 108 can additionally rotate about the longitudinal axis 106. A neural network trained in a suitable manner can be used to determine the second rotation angle 112 and the third rotation angle 114 with sufficient accuracy, on the other hand.

Different types and topologies of neural networks can be used for this purpose. For example, the table below shows examples of results of a systematic examination of different network types and topologies for determining the first rotation angle 110 (alpha), and also the second rotation angle 112 (Tilt Y) and the third rotation angle 114 (Tilt X).

| Network | Max Tilt X error [deg], third rotation angle 114 | Max Tilt Y error [deg], second rotation angle 112 | Max alpha error [deg], first rotation angle 110 | Number of parameters |
|---|---|---|---|---|
| 1) classification network alpha [50-30-20] + regression network Tilt X, Tilt Y [10-10-10] | 2.3 | 6.3 | 40 | 2563 |
| 2) classification network alpha [30-25-15] + regression network Tilt X, Tilt Y [20-15-10] | 0.8 | 1 | 28 | 1690 |
| 3) regression network sin/cos [20-15-10] + regression network Tilt X, Tilt Y [20-15-10] | 0.8 | 1 | 3.8 | 990 |

The examination involved fully connected feedforward networks with three hidden layers being examined, which is not intended to mean that other network topologies cannot likewise lead to similar or possibly even better prediction results and accordingly be used in other exemplary embodiments. For the specific application inside a joystick, the examined feedforward networks are suitable since they require comparatively little computation complexity in comparison with other network types, which is advantageous if the neural network is intended to be embodied within a controller of the joystick.

Figure 4:
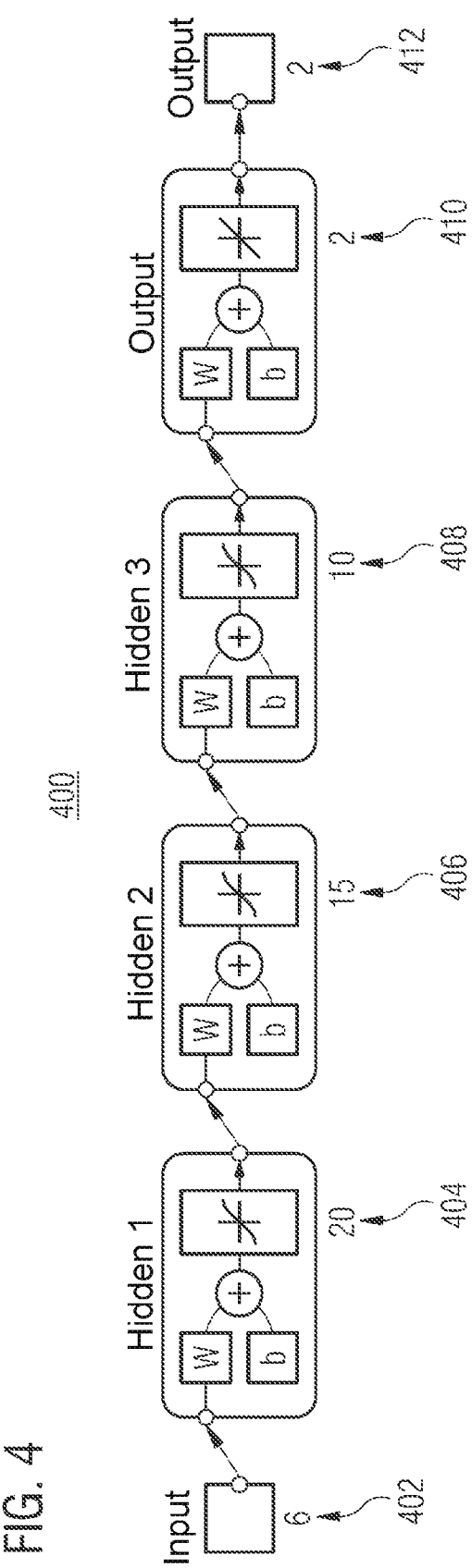
FIG. 4 shows an example of a topology of an exemplary embodiment of a neural network.

The determination of the second rotation angle 112 and the third rotation angle 114 involved various network topologies being examined that each have a regression layer as last layer, that is to say are regression networks. An example of the topology of the examined networks is depicted in FIG. 4. The determination of the first rotation angle 110 involved both classification networks and regression networks being examined. The first column of the table shown above respectively indicates how many nodes the network used has in each of the three layers, and what network type is involved. The other columns of the table indicate the magnitude of the maximum prediction error observed for the third angle 114, the second angle 112 and the first angle 110. The last column of the table indicates how many parameters to be learned the hidden layers of the two networks have altogether.

The examination summarized in the second row of the table involved the use of a classification network with the topology cited in the table (50 nodes in the first layer, 30 nodes in the second layer and 20 nodes in the third layer) for determining the first rotation angle 110. The output vector used for the network was a vector having 90 entries, one for each class to be determined. This results in a theoretical angle resolution of 4° for a possible rotation through 360°.

As is evident from the table, the observed error of 40° is significantly larger, indicating an overly complex model and resultant overfitting during the training phase. The small number of nodes in the regression network for determining the second rotation angle 112 and the third rotation angle 114 suggests that the complexity of the model is too low, on the other hand. Nevertheless, it should be noted that both the classification network for determining the first rotation angle 110 and the regression network for determining the second rotation angle 112 and the third rotation angle 114 deliver usable results in principle and that even network topologies with little optimization are suitable for analyzing magnetic fields and determining the attitude of one of these causative magnets in space.

The third row of the table shows the results of the examination if a classification network of reduced complexity (smaller number of nodes in the individual layers) is used for the first rotation angle 110, and the use of a regression network of higher complexity for the second and third rotation angles. As can be seen, this allows the accuracy to be increased in all instances of application, with discernible divergences still arising when the first rotation angle 110 is determined.

A regression network was therefore also used for determining the first rotation angle 110 for the results in the fourth row of the table, as a result of which the accuracy of the prediction is significantly increased.

The use of a regression network, which is particularly suitable for processing series of input values, may be advantageous for the application in a joystick, since the magnet can move only on constant paths in this application, since it is rigidly connected to the bearing 104. The progressively measured components of the magnetic field are therefore series of input values for which only specific trends are possible, which is readily predictable by means of a regression network.

According to some exemplary embodiments, the evaluation logic unit therefore corresponds to a neural network whose last layer is a regressive layer.

As can also be seen from the consideration above, a complexity of the neural network is suitably chosen, for example, if said network has a number of nodes that is greater than 30 and less than 100. In the application for determining the attitude of a magnet on the basis of the magnetic field produced thereby, such complexity ensures adequate prediction accuracy without leading to overfitting.

Further, a problem-matched choice for the network topology that leads to good prediction accuracy is made for example for exemplary embodiments that have between 10 and 30 nodes in the first layer of the neural network. The choice of a fully connected feedforward network having three layers allows the functionality of the network to run on simple hardware. This functionality can therefore be implemented within a controller directly integrated in a joystick, for example, so that said controller can directly produce a measured value for each degree of freedom of the movement of the joystick, for example the rotation angles 110,112, and 114 from FIG. 1.

Although, as described with reference to FIG. 1, measuring the components of the magnetic field by means of a single magnetic field sensor 120 at just one position is sufficient to determine information about the attitude of the magnet by means of a neural network, it is possible for precision to be increased, according to some exemplary embodiments, by virtue of further components of the field produced by the magnet at a second position additionally being measured at the second position, for example using the second magnetic field sensor 122, which is depicted optionally in FIG. 1.

Exemplary embodiments of joysticks can thus have a first magnetic field sensor 120 arranged at a fixed location with respect to the housing and a second magnetic field sensor 122 arranged at a fixed location with respect to the housing. The position of the magnetic field sensors may be arbitrary, for example the magnetic field sensors can also be arranged at an acute angle or at a 90° angle with respect to the undeflected longitudinal axis 106, leading to good results in the prediction.

Correspondingly, it is possible for further exemplary embodiments of circuits for determining information about the attitude of a magnet to have an input interface designed to receive first components of a magnetic field produced by the magnet at a first position and to additionally receive second components of a magnetic field produced by the magnet at a second position.

According to some exemplary embodiments, the direction of the magnetic field is determined completely, i.e. the circuit receives three linearly independent components of the magnetic field in each case, either from one sensor or from two sensors.

According to further exemplary embodiments and application scenarios, it may be sufficient to process just two components of the magnetic field. Further exemplary embodiments can alternatively also just receive the absolute value of the field strength as a value for the neural network.

Although, in principle, it is possible to produce any information that explicitly describes the attitude of the magnet in the specific instance of application by means of a single trained neural network, FIG. 1 shows an exemplary embodiment in which the optional second trained neural network 158 is used for the first rotation angle 110, whereas the first neural network 156 is used for the second rotation angle 112 and the third rotation angle 114. The first neural network 156 is trained to determine a vector having two components, the first component of which is the second rotation angle 112 with respect to the first axis 113 and the second component of which is the third rotation angle 114 with respect to the second axis 115. The second neural network 158 is trained to determine a vector having two components, the first component of which is a sine of the first rotation angle 110 of the rotation of the magnet about the longitudinal axis 106, the second component of the vector being the cosine of the first rotation angle 110. Rotation angle 110 itself is obtained as the arc tangent of the quotient of the two components.

The effect of not directly training the output of the first rotation angle 110 by the neural network can be that the neural network can be trained successfully, which might otherwise be prevented by ambiguities of angle. The network would otherwise learn two angles that differ by 360° as outputs of equal quality. This ambiguity is implicitly removed by the choice of the periodic functions to be trained, which means that the neural network can be trained successfully.

According to further exemplary embodiments, a neural network can also be trained to predict the first rotation angle 110 directly. Equally, a neural network can also be trained to predict the sine or cosine of one or both of the second rotation angle 112 or the third rotation angle 114 for the relevant angle. If a single neural network is used to predict all three rotation angles 110, 112 and 114, it may be beneficial to predict both the sine and the cosine for all of the angles so that the variables to be learned within the network do not differ too greatly, which could otherwise hamper learning.

Figures 1, 2:
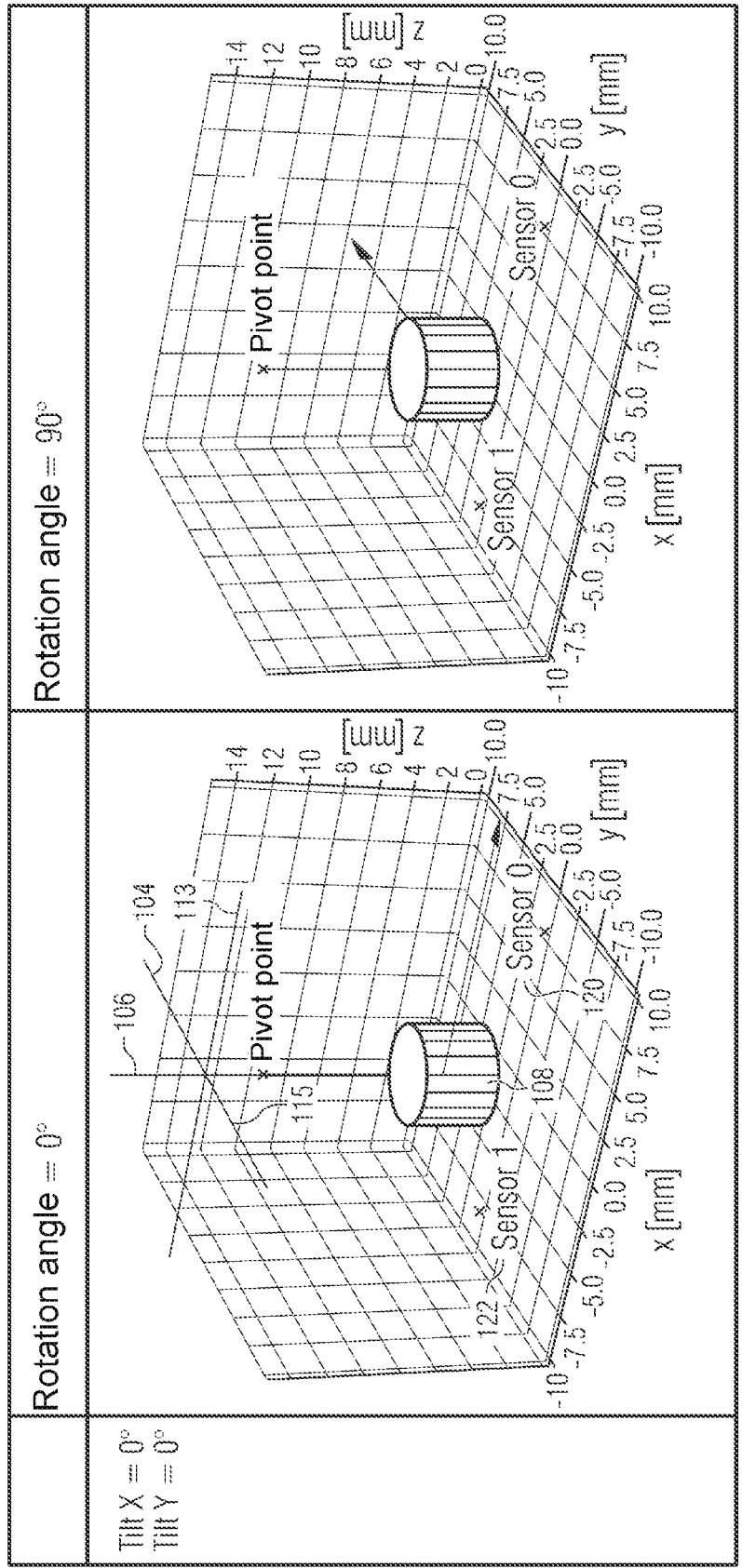
Figure 2:
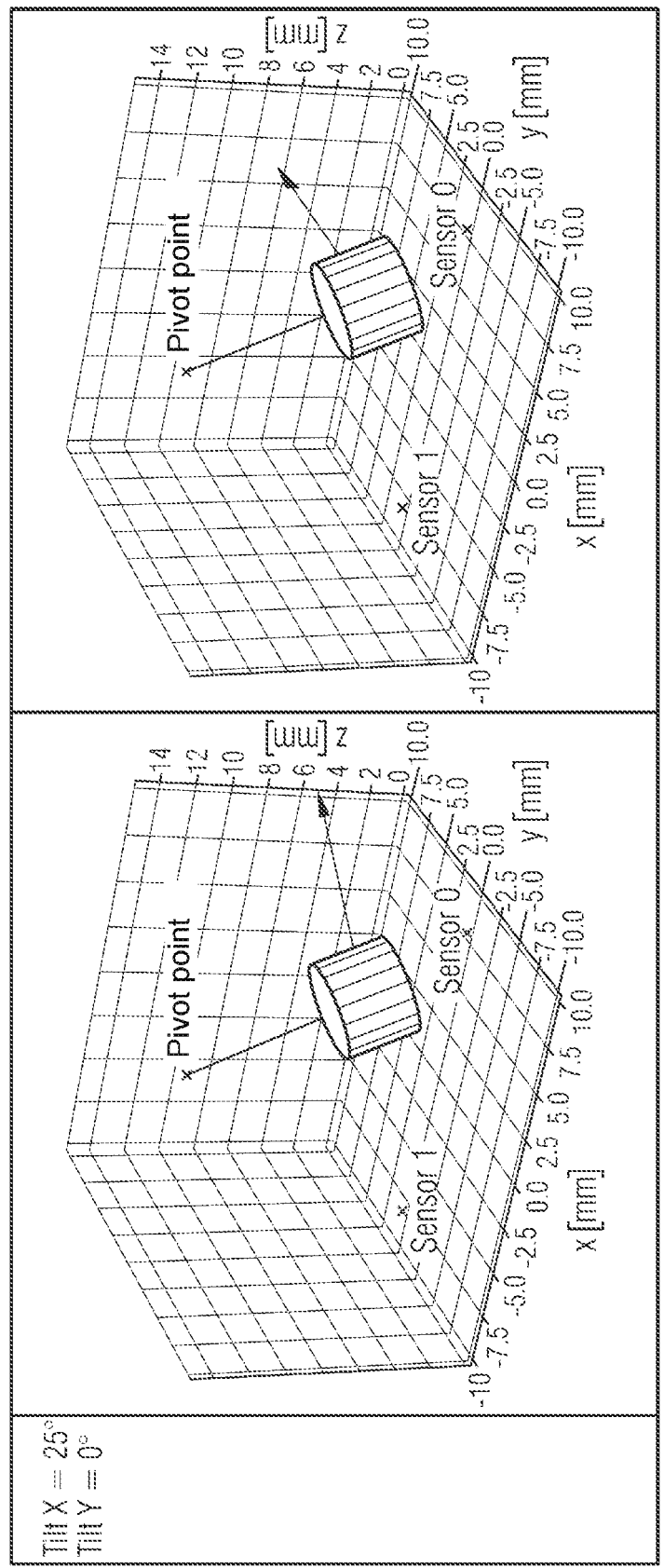
Figures 2, 3:
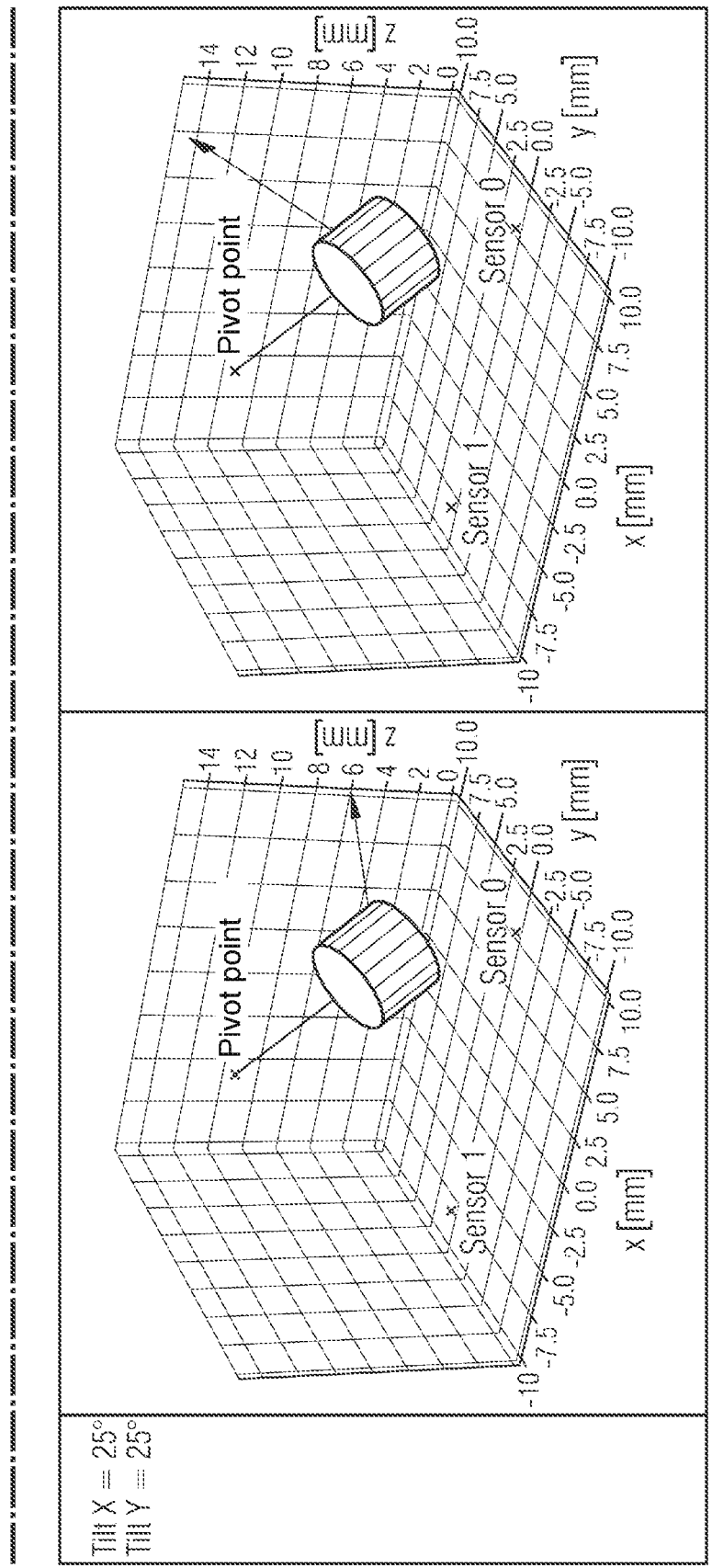
Figure 3:
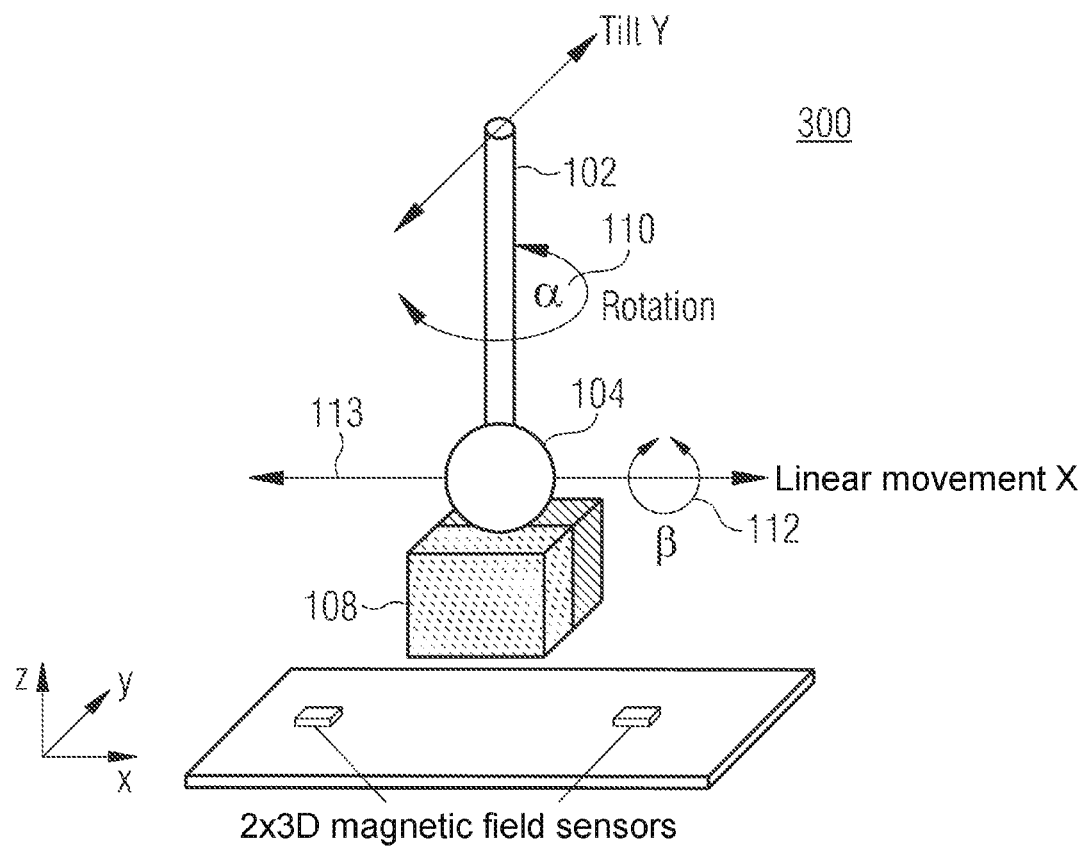

The neural network can be trained on the basis of the principle of supervised learning, for example, by virtue of the network thus receiving training data for which the desired output of the network is known a priori. FIGS. 2-1, 2-2, and 2-3 show a plurality of such training configurations for a given arrangement by way of example. The arrangement is substantially defined by the position of the bearing 104 relative to the magnet 108 and by the position of the sensors 120 and 122. In the case specifically depicted, a first magnetic field sensor is at the position X=8 mm, Y=0 mm, Z=0 mm and a second magnetic field sensor is at the position X=−8 mm, Y=0 mm, Z=0 mm. The magnet is cylindrical and has a height of 4 mm and a diameter of 5 mm. The bearing point, that is to say the point through which all of the axes of rotation pass, is at position X=0 mm, Y=0 mm, Z=14 mm and the length of the arm between the bearing point and the magnet is 10 mm.

It should be noted, however, that for example the relative position between the sensor and the magnet is not tied to this or a similar configuration, but the training of the neural network must be performed for a position once chosen. In FIG. 2-1, the left-hand depiction shows the magnet of the joystick in a position of rest, that is to say when it has not been deflected. Each of the three depictions on the right-hand side of FIGS. 2-1, 2-2, and 2-3 show a rotation about the longitudinal axis 160 through 90°, the first rotation angle 110 in these depictions thus being 90°. Additionally, the individual training data records differ by virtue of different deflections or rotations with respect to the axes 113 and 115. The training data that the neural network requires for the respective deflections are the components of the magnetic field that are measured at the positions of the sensor or sensors. These can be produced in two ways. First, the components can be determined arithmetically as part of a numerical simulation for the different positions and can be used as training input. Second, the components of the magnetic field can also be measured on an already existing hardware of a joystick directly.

FIG. 3 shows a further exemplary embodiment of a joystick 300 having three degrees of freedom for the movement, these differing from the example discussed in FIG. 1, however. Unlike in the case shown in FIG. 1, the third degree of freedom is not a further rotation about an axis perpendicular to the first axis 113, but rather the third degree of freedom is the possibility of lateral movement along the axis 113. In other words, the third degree of freedom of the joystick 300 is not a rotation about the axis 113 but rather a lateral movement of the control lever 102 in a direction defined by the bearing 104 adjusted therefor, for example in the direction of the axis 113.

Since it has already been set out above that neural networks can be used to determine any attitude of a magnet in space on the basis of the measured components of the magnetic field produced by the magnet, the exemplary embodiment shown in FIG. 3 differs from the exemplary embodiment discussed thoroughly in FIG. 1 merely in that the neural network needs to be trained using the training data that match the three degrees of freedom of the exemplary embodiment from FIG. 3. For further details of the discussion, to avoid repetition reference should therefore be made to the explanations concerning FIGS. 1 and 2, which can be transferred directly to the exemplary embodiment of FIG. 3.

FIG. 4 shows a specific example of a network topology of a neural network that can be used to determine the attitude of the magnet on the basis of the components of the magnetic field produced by the magnet. In particular, FIG. 4 shows the topology of a neural network 400 that forms the basis for the examination that was discussed above with reference to the table. The neural network has an input layer 402, which transfers three components of the magnetic field for each of two measurement points to the three-layer feedforward network. A first layer 404 of the network 400 contains 20 nodes, the second layer 406 contains 15 nodes and the third layer 408 of the network contains 10 nodes. The last layer of the neural network is a regressive layer 410 having two nodes for the output values that are to be predicted, and a vector whose components are the trained variables is transferred at the output 412 of the network 400. According to the exemplary embodiments discussed above, these are either the sine and the cosine of the first rotation angle 110 or the second rotation angle 112 and the third rotation angle 114. As already mentioned, any other neural networks that have a totally different topology or use the different mappings between the individual layers of the network can be used for further exemplary embodiments.

Figure 5:
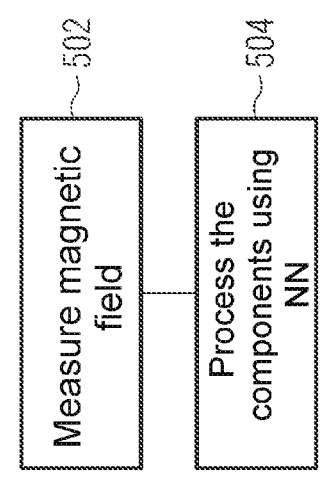
FIG. 5 shows a flow diagram for an exemplary embodiment of a method for determining information about an attitude of a magnet.

Merely for the sake of completeness, the simple flow diagram in FIG. 5 is again used to summarize an exemplary embodiment of a method for determining information about the attitude of a magnet. The method initially comprises measuring 502 components of a magnetic field 502 produced by the magnet. The method further comprises processing 504 the measured components by means of a trained neural network.

Such a method can be used for example to determine a first rotation angle, a second rotation angle and a third rotation angle, each of which indicates a rotation of a magnet about one of three axes, which are nonparallel with one another in pairs.

The exemplary embodiments are not restricted to this specific type of the parameters describing the attitude of the magnet, however. Rather, neural networks can be trained for any other parameter configurations allowing the attitude, for example the position and orientation, of a magnet in space to be determined explicitly.

In the case of a joystick, for example a first trained neural network can be used to determine a vector having two components, the first component of which indicates a sine of a first rotation angle of a rotation of the magnet about a longitudinal axis and the second component of which indicates a cosine of the first rotation angle. Alternatively or at the same time, a second trained neural network can be used to determine a vector having two components, the first component of which indicates a second rotation angle of the magnet for a rotation of the longitudinal axis about a first axis and the second component of which indicates a third rotation angle of the magnet for a rotation of the longitudinal axis about a second axis, which is perpendicular thereto.

The preceding paragraphs have discussed the exemplary embodiments of a method and a circuit for determining an attitude of a magnet essentially for a magnet that is arranged inside a joystick. A series of advantages are obtained for such a joystick as a result of the use of the neural network. In comparison with conventional solutions, the joystick requires just a single magnet. That is to say that some exemplary embodiments of a joystick have a single magnet. The mechanics of the system are greatly simplified if all three degrees of freedom can be evaluated collectively; in particular, such a joystick requires just a single bearing. It is therefore possible to use any standardized joystick layout in principle. The measurement is contactless and therefore has little susceptibility to wear and soiling. The measurement principle does not limit the first rotation angle of the rotation about the longitudinal axis; the full 360 degree range is available. The learning capability of the neural network means that the joystick is not tied to a specific mechanical configuration. On the contrary, there is a high level of room for creative maneuver in the design of the joystick. An exact positioning of the sensor, an exact size and shape of the magnet, the size of the air gap between the magnet and the sensor and the length or geometric form of the control lever are not limited in any way, since the trained neural network can learn all possible configurations during training. In particular, for example the relative arrangement of multiple sensors for determining the magnetic field among one another and the number of the sensors themselves can also be varied arbitrarily. Further exemplary embodiments can thus have not just one or two sensors but rather for example also 3, 4 or 5 sensors for determining the components of the magnetic field at different locations.

The exemplary embodiments that have been described above are not restricted to the application in joysticks, of course. On the contrary, any other applications in which the attitude of a magnet is intended to be determined or in which a magnet is used to determine the movement of any kind of control device can use exemplary embodiments of the method described herein or of the circuit described herein. For example, further exemplary embodiments may be multifunctional input devices for motor vehicles, input devices for electronic devices or graphic input devices for computers.

The aspects and features that have been described together with one or more of the examples and figures described in detail above can also be combined with one or more of the other examples in order to replace an identical feature of the other example or in order additionally to introduce the feature into the other example.

Examples can furthermore be or relate to a computer program comprising a program code for carrying out one or more of the above methods when the computer program is executed on a computer or processor. Steps, operations or processes of various methods described above can be performed by programmed computers or processors. Examples can also cover program storage devices, e.g. digital data storage media, that are machine-, processor- or computer-readable and code machine-executable, processor-executable or computer-executable programs of instructions. The instructions carry out some or all of the steps of the methods described above or cause them to be carried out. The program storage devices can comprise or be e.g. digital memories, magnetic storage media such as, for example, magnetic disks and magnetic tapes, hard disk drives or optically readable digital data storage media. Further examples can also cover computers, processors or control units programmed to carry out the steps of the methods described above, or (field) programmable logic arrays ((F)PLAs) or (field) programmable gate arrays ((F)PGAs) programmed to carry out the steps of the methods described above.

The description and drawings present only the principles of the disclosure. Furthermore, all examples mentioned here are intended to be used expressly only for illustrative purposes, in principle, in order to assist the reader in understanding the principles of the disclosure and the concepts contributed to by the inventor(s) for further development of the art. All statements herein regarding principles, aspects and examples of the disclosure and also concrete examples thereof encompass the counterparts thereof.

A function block designated as "means for . . . " carrying out a specific function can relate to a circuit configured for carrying out a specific function. Consequently, a "means for something" can be implemented as a "means configured for or suitable for something", e.g. a component or a circuit configured for or suitable for the respective task.

Functions of different elements shown in the figures, including any function blocks designated as "means", "means for providing a signal", "means for generating a signal", etc., can be implemented in the form of dedicated hardware, e.g. "a signal provider", "a signal processing unit", "a processor", "a controller", etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP hardware), network processors, application specific integrated circuits (ASICs), field programmable logic arrays (FPGAs=field programmable gate arrays), read only memory (ROM) for storing software, random access memory (RAM) and non-volatile memory devices (storage). Other hardware, conventional and/or customized, can also be included.

A block diagram can illustrate for example a rough circuit diagram that implements the principles of the disclosure. In a similar manner, a flow diagram, a flowchart, a state transition diagram, a pseudo-code and the like can represent various processes, operations or steps that are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of multiple steps, processes, operations or functions disclosed in the description or the claims should not be interpreted as being in the specific order, unless this is explicitly or implicitly indicated otherwise, e.g. for technical reasons. The disclosure of multiple steps or functions therefore does not limit them to a specific order unless said steps or functions are not interchangeable for technical reasons. Furthermore, in some examples, an individual step, function, process or operation can include multiple partial steps, functions, processes or operations and/or be subdivided into them. Such partial steps can be included and be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A circuit for determining information about an attitude of a magnet, comprising:
    an input interface configured to receive components of a magnetic field produced by the magnet; and
    an evaluation processing system, including at least one trained neural network, that is configured to determine the information about the attitude of the magnet based on the received components,
        wherein the evaluation processing system is configured to determine a vector having two vector components, a first vector component of which indicates a sine of a first rotation angle of a rotation of the magnet about a longitudinal axis and a second vector component of which indicates a cosine of the first rotation angle.

2. The circuit as claimed in claim 1, wherein the input interface is configured to receive first components of the magnetic field produced by the magnet at a first position and to receive second components of the magnetic field produced by the magnet at a second position.

3. The circuit as claimed in claim 2, wherein the input interface is configured to receive three linearly independent components of the magnetic field for both the first position and the second position.

4. The circuit as claimed in claim 1, wherein a particular trained neural network of the at least one trained neural network includes a last layer that is a regressive layer.

5. The circuit as claimed in claim 1, wherein the at least one trained neural network includes a particular trained neural network whose number of nodes is greater than 30 and less than 100.

6. The circuit as claimed in claim 5, wherein the at least one trained neural network includes a particular trained neural network whose number of nodes in a first layer of the particular trained neural network is greater than 10 and less than 30.

7. The circuit as claimed in claim 1, wherein the at least one trained neural network includes a particular trained neural network that is a fully connected feedforward network having three layers.

8. The circuit as claimed in claim 1, wherein the first vector component indicates the first rotation angle of the magnet with respect to a first axis and the second vector component indicates a second rotation angle of the magnet with respect to a second axis, which is perpendicular to the first axis.

9. The circuit as claimed in claim 1, wherein the vector is a first vector, and
    wherein the evaluation processing system is configured to determine a second vector having two vector components, a third vector component of the second vector indicates a second rotation angle of the magnet with respect to a first axis and a fourth vector component of the second vector indicates a third rotation angle of the magnet with respect to a second axis, which is perpendicular to the first axis.

10. The circuit as claimed in claim 1, wherein the vector is a first vector:
the evaluation processing system includes at least one first trained neural network and at least one second trained neural network,
wherein the first trained neural network is trained to determine the first vector; and
wherein the second trained neural network is trained to determine a second vector having two vector components, a third vector component of which indicates a second rotation angle of the magnet for a rotation of the longitudinal axis about a first axis and a fourth vector component of which indicates a third rotation angle of the magnet for a rotation of the longitudinal axis about a second axis, which is perpendicular to the first axis.

11. The circuit as claimed in claim 1, wherein at least one trained neural network is trained to determine the first rotation angle, a second rotation angle, and a third rotation angle, each of which indicates the rotation of the magnet about one of three axes, which are nonparallel with one another in pairs.

12. A joystick, comprising:
a bearing, by means of which a control lever is mounted so as to move with at least three degrees of freedom with respect to a housing,
wherein the control lever has a portion movable by a user and an inner portion, which are opposite one another on different sides of the bearing in a longitudinal direction;
a magnet arranged on the control lever;
at least one magnetic field sensor, each of which is arranged at a fixed location with respect to the housing and is configured to measure magnetic field components of a magnetic field produced by the magnet; and
an evaluation processing system, including at least one trained neural network, that is configured to determine information associated with an attitude of the magnet based on the magnetic field,
wherein the evaluation processing system is configured to determine a vector having two vector components, a first vector component of which indicates a sine of a rotation angle of a rotation of the magnet about a longitudinal axis and a second vector component of which indicates a cosine of the rotation angle.

13. The joystick as claimed in claim 12, further comprising:
a first magnetic field sensor, which is arranged at a first fixed location with respect to the housing and is configured to measure first magnetic field components of the magnetic field produced by the magnet; and
a second magnetic field sensor, which is arranged at a second fixed location with respect to the housing and is configured to measure second magnetic field components of the magnetic field produced by the magnet.

14. The joystick as claimed in claim 12,
wherein the at least one trained neural network is configured to determine information about the attitude of the magnet based on the measured magnetic field components and configured to generate a measured value for each degree of freedom of movement based on the measured magnetic field components.

15. The joystick as claimed in claim 12, wherein:
a first degree of freedom, of the at least three degrees of freedom, is a rotation of the control lever about the longitudinal direction;
a second degree of freedom, of the at least three degrees of freedom, is a tilting of the control lever about an axis defined by the bearing; and
a third degree of freedom, of the at least three degrees of freedom, is a tilting of the control lever about a further axis defined by the bearing or a lateral movement of the control lever in a direction defined by the bearing.

16. The joystick as claimed in claim 12, wherein the magnet is magnetized perpendicularly to the longitudinal direction.

17. A method for determining information about an attitude of a magnet, the method comprising:
measuring components of a magnetic field produced by the magnet; and
processing the measured components using a trained neural network in order to determine the information about the attitude of the magnet,
wherein the information about the attitude of the magnet is an angle of a rotation of the magnet about a longitudinal axis, and
wherein the trained neural network is used to determine a vector having two vector components, a first vector component of which indicates a sine of the angle and a second vector component of which indicates a cosine of the angle.

18. The method as claimed in claim 17, wherein the measuring comprises:
measuring first components of the magnetic field produced by the magnet at a first position; and
measuring second components of the magnetic field produced by the magnet at a second position.

19. The method as claimed in claim 18, wherein three linearly independent components of the magnetic field are measured at both the first and the second position.

20. The method as claimed in claim 17, wherein a last layer of the trained neural network is a regressive layer.

21. The method as claimed claim 17, wherein a number of nodes in the trained neural network is greater than 30 and less than 100.

22. The method as claimed in claim 21, wherein a number of nodes in a first layer of the trained neural network is greater than 10 and less than 30.

23. The method as claimed in claim 17, wherein the trained neural network is a fully connected feedforward network having three layers.

24. The method as claimed in claim 17,
wherein the first vector component indicates a first tilt angle with respect to a first axis and the second vector component indicates a second tilt angle with respect to a second axis.

25. A non-transistor computer-readable medium storing a computer program having a program code that, when executed on a programmable processor, causes performance of the method as claimed in claim 17.

* * * * *